US010019832B2

(12) United States Patent
Park et al.

(10) Patent No.: US 10,019,832 B2
(45) Date of Patent: Jul. 10, 2018

(54) METHOD OF GENERATING AND TRAVERSING ACCELERATION STRUCTURE

(71) Applicant: SAMSUNG ELECTRONICS CO., LTD., Suwon-si (KR)

(72) Inventors: Jeongsoo Park, Gwacheon-si (KR); Youngsam Shin, Hwaseong-si (KR); Sangoak Woo, Anyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 52 days.

(21) Appl. No.: 15/197,339

(22) Filed: Jun. 29, 2016

(65) Prior Publication Data

US 2017/0061673 A1 Mar. 2, 2017

(30) Foreign Application Priority Data

Aug. 31, 2015 (KR) .................. 10-2015-0123203

(51) Int. Cl.
*G06T 15/06* (2011.01)
(52) U.S. Cl.
CPC .................... *G06T 15/06* (2013.01)
(58) Field of Classification Search
CPC ..................................... G06T 15/06
See application file for complete search history.

(56) References Cited

U.S. PATENT DOCUMENTS

| 8,253,730 | B1* | 8/2012 | Carr | G06T 17/005 345/419 |
| 8,289,324 | B1* | 10/2012 | Laine | G06T 17/005 345/426 |
| 8,471,845 | B1* | 6/2013 | Stich | G06T 15/06 345/419 |
| 8,564,589 | B1* | 10/2013 | Aila | G06T 15/06 345/418 |
| 2007/0024615 | A1* | 2/2007 | Keller | G06T 15/06 345/421 |
| 2007/0182732 | A1* | 8/2007 | Woop | G06T 15/005 345/420 |
| 2008/0024489 | A1* | 1/2008 | Shearer | G06T 15/06 345/421 |
| 2009/0167763 | A1* | 7/2009 | Waechter | G06T 15/06 345/426 |
| 2009/0256836 | A1 | 10/2009 | Fowler et al. | |

(Continued)

FOREIGN PATENT DOCUMENTS

| JP | 2007-73063 A | 3/2007 |
| KR | 10-2011-0050143 A | 5/2011 |
| KR | 10-2013-0092055 A | 8/2013 |

*Primary Examiner* — Barry Drennan
*Assistant Examiner* — Phong Nguyen
(74) *Attorney, Agent, or Firm* — F. Chau & Associates, LLC

(57) ABSTRACT

A method of generating an acceleration structure for ray tracing, the method including, using a processor, dividing a three-dimensional (3D) space including primitives into bounding boxes, obtaining position information of where the bounding boxes overlapping each other, and generating an acceleration structure representing the position information and an inclusion relation between the bounding boxes. Also disclosed is a related method of traversing an acceleration structure.

12 Claims, 16 Drawing Sheets

(56) References Cited

U.S. PATENT DOCUMENTS

| | | | |
|---|---|---|---|
| 2009/0284523 A1* | 11/2009 | Peterson | G06T 15/06 345/419 |
| 2010/0097372 A1* | 4/2010 | Gies | G06T 15/06 345/419 |
| 2010/0188403 A1* | 7/2010 | Mejdrich | G06T 15/06 345/426 |
| 2012/0075287 A1* | 3/2012 | Park | G06T 15/06 345/419 |
| 2013/0207967 A1 | 8/2013 | Park et al. | |
| 2015/0302629 A1* | 10/2015 | Obert | G06T 15/06 345/426 |
| 2015/0348307 A1* | 12/2015 | Lee | G06T 15/06 345/426 |
| 2016/0071313 A1* | 3/2016 | Laine | G06T 15/10 345/419 |
| 2016/0093090 A1* | 3/2016 | Shin | G06T 15/06 345/419 |

* cited by examiner

METHOD OF GENERATING AND TRAVERSING ACCELERATION STRUCTURE

CROSS-REFERENCE TO RELATED APPLICATION(S)

This application claims the benefit under 35 USC 119(a) of Korean Patent Application No. 10-2015-0123203 filed on Aug. 31, 2015 in the Korean Intellectual Property Office, the entire disclosure of which is incorporated herein by reference for all purposes.

BACKGROUND

1. Field

The following description relates to methods of generating and traversing an acceleration structure.

2. Description of Related Art

Three-dimensional (3D) rendering refers to image processing for synthesizing 3D object data into an image viewed from a given viewpoint of a camera. Ray tracing refers to a process of tracing a point where scene objects to be rendered and a ray intersect. Ray tracing includes traversal of an acceleration structure and an intersection test between a ray and a primitive. However, for the traversal and the intersection test, a large amount of computation and a broad memory bandwidth are required.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Provided are methods and devices for a method and a device for terminating traversal of an acceleration structure early by reducing additional traversals. Such early termination improves the efficiency of such a traversal.

Provided are non-transitory computer readable recording media having recorded thereon computer programs for implementing such a method.

Additional examples are set forth in part in the description which follows and, in part, are apparent from the description, or are learned by practice of the presented examples.

In one general aspect, a method of generating an acceleration structure for ray tracing includes dividing, using a processor, a three-dimensional (3D) space including primitives into bounding boxes, obtaining, using the processor, position information of where the bounding boxes overlap each other, and generating, using the processor, an acceleration structure representing the position information and an inclusion relation between the bounding boxes.

The obtaining the position information of where the bounding boxes overlap each other may include dividing, using the processor, the 3D space into grids, and obtaining, using the processor, a grid position in the grids where the bounding boxes overlap each other.

The obtaining the grid positions may include determining, using the processor, vertices of overlapping bounding boxes, and obtaining, using the processor, a grid position corresponding to the vertices, wherein the grid position is represented by at least one bit.

In another general aspect, a method of traversing an acceleration structure including one or more nodes includes traversing, using a processor, the acceleration structure until the traversing reaches a leaf node, obtaining, using the processor, a hit point of a primitive intersected by ray data by traversing the leaf node, and traversing, using the processor, a node of the acceleration structure comprising the hit point.

The traversing a node may include terminating the traversal if there is no node that comprises the hit point.

The traversing a node may include updating the hit point if a primitive intersected by the ray data exists in the node.

Each node of the one or more nodes may correspond to one of the bounding boxes which divide a three-dimensional (3D) space, and may include position information of where the bounding boxes overlap each other.

The 3D space may be divided into grids, and the position information may include grid positions where the bounding boxes overlap each other.

The hit point may be indicated by a grid position where the primitive is located.

In another general aspect, a device for generating an acceleration structure for ray tracing includes a memory configured to store information about a three-dimensional (3D) space, and a processor configured to divide the 3D space comprising primitives into bounding boxes, obtain position information of where the bounding boxes overlap each other, and generate an acceleration structure representing the position information and an inclusion relation between the bounding boxes.

The processor may divide the 3D space into grids and may obtain a grid position in the grids where the bounding boxes overlap each other.

The processor may determine vertices of overlapping bounding boxes and may obtain a grid position corresponding to the vertices, wherein the grid position is represented by at least one bit.

In another general aspect, a device for traversing an acceleration structure including one or more node includes a processor configured to traverse the acceleration structure until the traversing reaches a leaf node, obtain a hit point of a primitive intersected by ray data by traversing the leaf node, and traverse a node of the acceleration structure comprising the hit point, and a memory configured to store the acceleration structure.

The processor may terminate the traversal if there is no node that comprises the hit point.

The processor may update the hit point if a primitive intersected by the ray data exists in the node.

Each node of the one or more nodes may correspond to one of the bounding boxes which divide a three-dimensional (3D) space, and comprises position information of where the bounding boxes overlap each other.

The 3D space may be divided into grids, and the position information may include grid positions where the bounding boxes overlap each other.

The hit point may be indicated by a grid position where the primitive is located.

A non-transitory computer-readable storage medium may store instructions for causing computing hardware to perform the method of generating an acceleration structure for ray tracing.

A non-transitory computer-readable storage medium may store instructions for causing computing hardware to perform the method of traversing an acceleration structure comprising one or more nodes.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
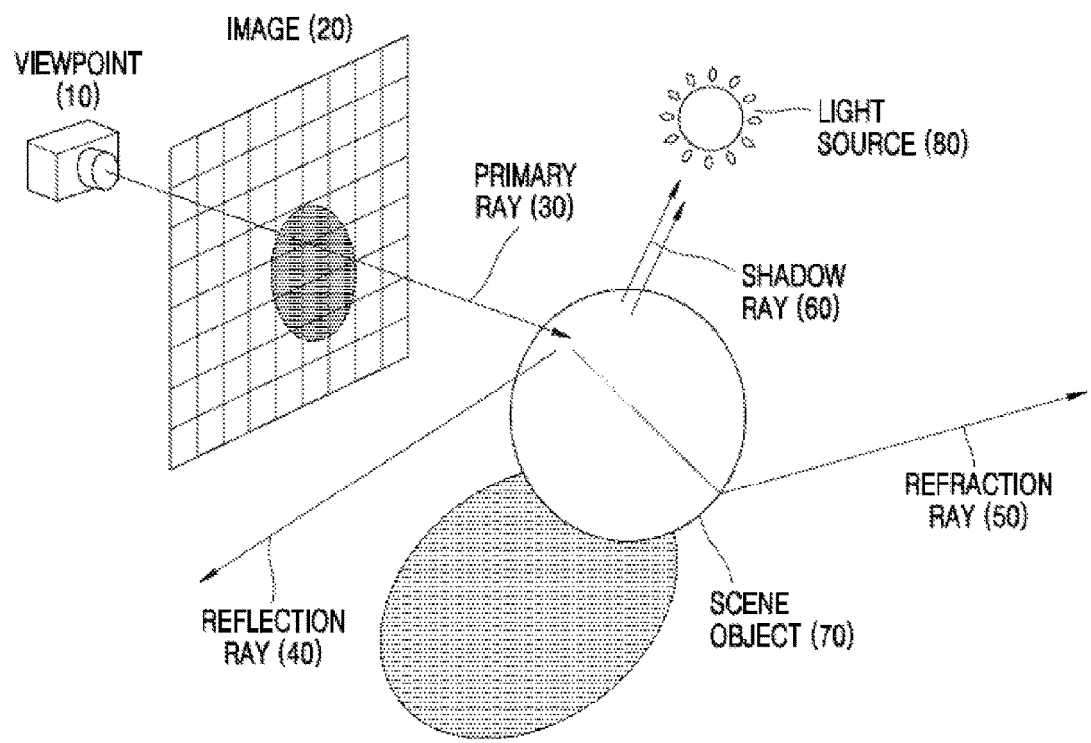
FIG. 1 is a schematic view to illustrate ray tracing.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Reference is now be made in further detail to examples, some of which are illustrated in the accompanying drawings, wherein like reference numerals refer to like elements throughout. In this regard, the present examples possibly have different forms and are not to be construed as being limited to the descriptions set forth herein. Accordingly, the examples are merely described below, by referring to the figures, to explain aspects of examples. As used herein, the term "and/or" includes any and all combinations of one or more of the associated listed items. Expressions such as "at least one" when preceding a list of elements, modify the entire list of elements and are not intended to modify the individual elements of the list.

FIG. 1 is a schematic view to illustrate ray tracing. Referring to the example of FIG. 1, in a three-dimensional (3D) modeling technique, a ray tracing core determines a viewpoint 10 and an image 20 according to the viewpoint 10. When the viewpoint 10 and the image 20 are determined, the ray tracing core generates a ray from the viewpoint 10 with respect to each pixel of the image 20.

Elements of ray tracing are now described further. In the example of FIG. 1, a primary ray 30 is generated from the viewpoint 10. For example, the primary ray 30 intersects with a scene object 70 after passing through the image 20. At an intersection point between the primary ray 30 and the scene object 70, a reflection ray 40 and a refraction ray 50 are further generated. Also, a shadow ray 60 is generated at the intersection point toward a light source 80. In this example, the reflection ray 40, the refraction ray 50, and the shadow ray 60 are referred to as secondary rays. The scene object 70 refers to an object that is to be rendered with respect to the image 20. For example, the scene object 70 includes a plurality of primitives.

The ray tracing core analyzes the primary ray 30 and the secondary rays. That is, the secondary rays include the reflection ray 40, the refraction ray 50, and the shadow ray 60, and rays that are derived from the secondary rays. For example, the ray tracing core determines a color value of each of pixels that form the image 20 based on such an analysis result. Also, the ray tracing core determines color values of pixels by considering characteristics of the scene object 70.

Figure 2:
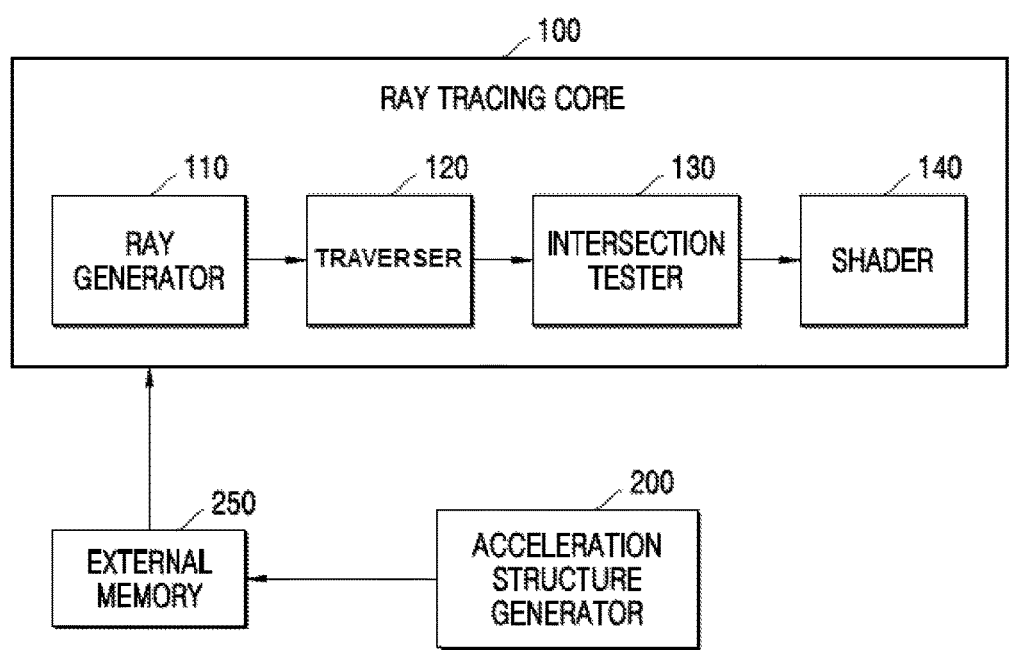
FIG. 2 is a schematic view to illustrate a ray tracing core.

FIG. 2 is a schematic view to illustrate a ray tracing core 100. Referring to the example of FIG. 2, the ray tracing core 100 includes a ray generating unit or ray generator 110, a traversal (TRV) unit or traverser 120, an intersection test (IST) unit or intersection tester 130, and a shading unit or shader 140. In FIG. 2, the traverser 120 and the intersection tester 130 are included in the ray tracing core 100. However, the traverser 120 and the intersection tester 130 are also optionally included separately as hardware elements. The ray tracing core 100 illustrated in FIG. 2 includes only elements related to the current example. However, in other examples, other general-use elements than the illustrated ones in FIG. 2 are further included in the ray tracing core 100 in addition to or instead of the elements that are listed, so as to assist in the functioning of the ray tracing core 100.

Hence, the ray tracing core 100 traces an intersection point between generated rays and objects located in 3D space, and determines color values of pixels that form an image. In other words, the ray tracing core 100 searches for an intersection point between rays and objects, generates a secondary ray according to characteristics of an object at the intersection point, and determines a color value of the intersection point accordingly.

For example, the ray tracing core 100 uses results of a previous traversal and previous intersection tests in a traversal of an acceleration structure and an intersection test. That is, the ray tracing core 100 performs current rendering faster by applying results obtained from previous rendering processing to the current rendering processing.

For example, the ray generator 110 generates a primary ray and a secondary ray. The ray tracing core 100 generates a first ray from a viewpoint. To do so, the ray generator 110 generates a reflection, refraction, or shadow secondary ray at an intersection point between the primary ray and an object. Also, another secondary ray is potentially generated at an intersection point between the above secondary ray and the object. For example, the ray generator 110 generates a reflection ray, a refraction ray or a shadow ray within a preset number of times of producing secondary rays, or determines the number of times of generating a reflection ray, a refraction ray, or a shadow ray according to characteristics of an object.

In the example of FIG. 2, the traverser 120 receives information about a ray generated by the ray generator 110. For example, the generated ray is a primary ray, a secondary ray, or a ray derived from the secondary ray. Also, regarding a primary ray, the traverser 120 receives information about a viewpoint and a direction of a generated ray. Also, regarding a secondary ray, the traverser 120 receives information about a starting point and a direction of a secondary ray. Here, a starting point of a secondary ray refers to a point which a primary ray has hit. Such a viewpoint or such a starting point is possibly expressed by coordinates, and such a direction is possibly expressed by a vector.

In this example, the traverser 120 reads information about an acceleration structure from an external memory 250. Such an acceleration structure is generated by an acceleration structure generating unit or acceleration structure generator 200, and the generated acceleration structure is stored in the external memory 250. An acceleration structure refers to a structure, such as a data structure, including position information of objects in 3D space. For example, an acceleration structure is a K-dimensional (KD) tree or a bounding volume hierarchy (BVH). However, these are only examples and other appropriate and relevant acceleration structures are used in other examples.

The traverser 120 traverses an acceleration structure so as to output an object or a leaf node that a ray has hit. For example, the traverser 120 searches for nodes included in an acceleration structure so as to output a leaf node that a ray has hit from among lowermost-ranking leaf nodes to the intersection tester 130. Alternatively put, the traverser 120 determines which bounding box of bounding boxes that form an acceleration structure is hit by a ray. Also, the traverser 120 determines which object included in the bounding box is hit by a ray. For example, information about a hit object is stored in a TRV cache. Here, a bounding box refers to a unit including a plurality of objects or a plurality of primitives and is expressed in different forms according to the form of the acceleration structure. For example, a TRV cache refers to a memory for temporarily storing data used by the traverser 120 in traversal.

In this example, the traverser 120 traverses an acceleration structure based on results of previous rendering. For example, the traverser 120 traverses an acceleration structure via the same route as a previous rendering based on the result of previous rendering that is stored in a TRV cache. For example, when the traverser 120 traverses an acceleration structure regarding a generated ray, the traverser 120 preferentially traverses a bounding box that is hit by a previous ray having the same viewpoint and the same direction as the generated ray. Also, the traverser 120 traverses an acceleration structure by referring to a search route with respect to a previous ray.

Then, the intersection tester 130 receives an object or a leaf node that is hit by a ray, from the traverser 120 and reads information from the external memory 250 about primitives included in a hit object, as determined. For example, information about the read primitives is stored in an IST cache. An IST cache refers to a memory used to temporarily store data used by the intersection tester 130 in an intersection test.

Furthermore, the intersection tester 130 conducts an intersection test between a ray and a primitive so as to output a primitive hit by a ray and an intersection point. The intersection tester 130 receives information from the traverser 120 about which object is hit by a ray and tests which primitives from among a plurality of primitives included in a hit object are hit by such a ray. After the intersection tester 130 finds a primitive hit by a ray, the intersection tester 130 outputs an intersection point indicating which point of the hit primitive intersects with the ray. For example, the intersection point is output to the shader 140 in coordinates.

The intersection tester 130 conducts an intersection test by using results of previous rendering processing. For example, the intersection tester 130 preferentially conducts an intersection test on the same primitive as that of previous rendering, based on results of previous rendering processing that are stored in the IST cache. For example, when the intersection tester 130 conducts an intersection test between a generated ray and a primitive, the intersection tester 130 preferentially conducts an intersection test on a primitive hit by a previous ray having the same viewpoint and the same direction as the generated ray.

Then, the shader 140 determines a color value of a pixel based on information about an intersection point, received from the intersection tester 130, and properties of a material of the intersection point. For example, the shader 140 potentially determines a color value of a pixel by considering a basic color of a material of the intersection point and effects due to a light source.

The ray tracing core 100 receives from the external memory 250 data used in the ray tracing operations. For example, an acceleration structure generated by the acceleration structure generator 200 or geometry data indicating information about primitives is stored in the external memory 250. Such a primitive is possibly a polygon such as a triangle or a rectangle, and geometry information possibly indicates information about vertices and positions of primitives included in such an object.

The acceleration structure generator 200 generates an acceleration structure, including position information about objects in 3D space. In examples, the acceleration structure generator 200 generates various types of acceleration structures. For example, an acceleration structure is generated by splitting 3D space using a hierarchical tree structure, and the acceleration structure generator 200 generates a structure indicating a relationship between objects in 3D space by applying a BVH or KD tree structure, as discussed further above. For example, the acceleration structure generator 200 determines a maximum number of primitives of a leaf node and a depth of a tree and generates an acceleration structure based on the determined maximum number and the determined depth of the tree.

Figure 3:
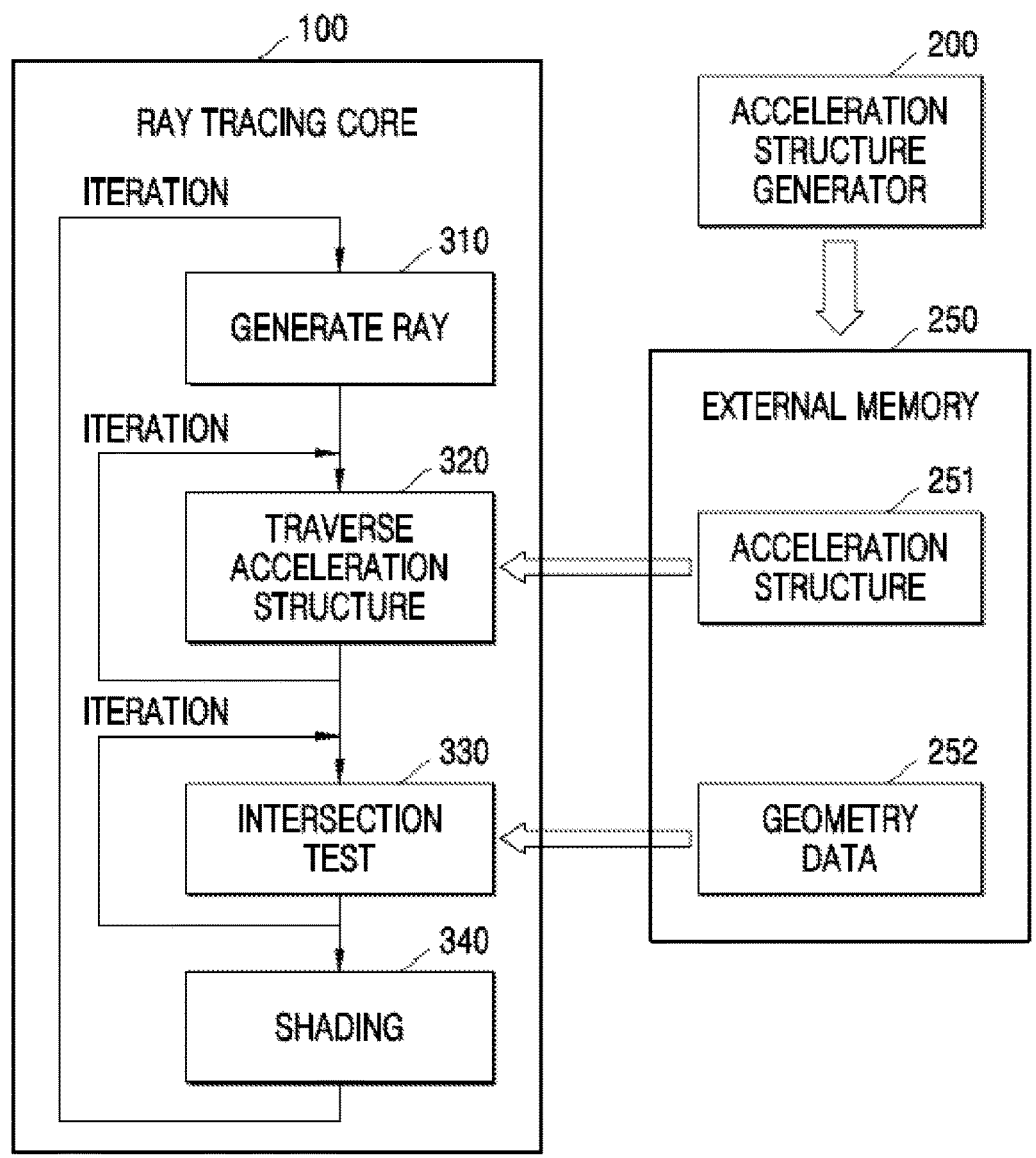
FIG. 3 is a schematic view to illustrate ray tracing performed by a ray tracing core.

FIG. 3 is a schematic view to illustrate ray tracing performed by a ray tracing core. For example, the ray tracing core has the structure of the ray tracing core 100 as shown in the example of FIG. 2. Accordingly, descriptions above of the ray tracing core 100 also apply to the ray tracing of the example of FIG. 3.

In operation 310, the ray tracing core 100 generates a ray. For example, the ray tracing core 100 generates a primary ray, a secondary ray, and rays derived from the secondary ray. The nature of secondary rays is further discussed, above.

In operation 320, the ray tracing core 100 traverses an acceleration structure read out from the external memory 250. For example, the ray tracing core 100 detects a bounding box hit by a ray, by traversing the acceleration structure 251 based on a viewpoint and a direction of generated rays, and then detects an object hit by a ray from among objects included in the hit bounding box. In this operation, the ray tracing core 100 repeats traversing the acceleration structure 251 until a hit object is detected. For example, the ray tracing core 100 traverses an acceleration structure along a predetermined route, and when a leaf node on the searched route is not hit by a ray, the ray tracing core 100 traverses other routes in the acceleration structure.

The ray tracing core 100 potentially sequentially traverses all routes. However, the ray tracing core 100 preferentially traverses a predetermined route based on search information of a previous ray. For example, the ray tracing core 100 preferentially searches for a route in which a hit leaf node is included in a previous node in an example in which the previous ray has the same or similar viewpoint and the same or similar direction as a current ray.

In operation 330, the ray tracing core 100 conducts an intersection test based on geometry data 252 of primitives read out from the external memory 250. In such an intersection test, the ray tracing core 100 iterates an intersection test until a hit primitive is detected. For example, the ray tracing core 100 conducts an intersection test on a primitive. Then, when any primitive is hit by a ray, the ray tracing core 100 conducts an intersection test on another primitive.

For example, the ray tracing core 100 sequentially conducts an intersection test on all primitives, but also preferentially tests a predetermined primitive based on information from an intersection test of a previous ray. For example, the ray tracing core 100 preferentially conducts an intersection test on a primitive that was hit by a previous ray when the previous ray and a current ray have the same or similar viewpoint and the same or similar direction. Such an approach takes advantage of the fact that because the previous ray and current ray are known to have such similarity in their viewpoint and direction, as a result it is more likely that their intersection properties are similar.

In operation 340, the ray tracing core 100 conducts shading of a pixel based on the intersection test. After operation 340 is completed, the ray tracing core 100 proceeds to operation 310. The ray tracing core 100 iterates operations 310 through 340 repetitively with respect to all pixels that form an image.

Figure 4:
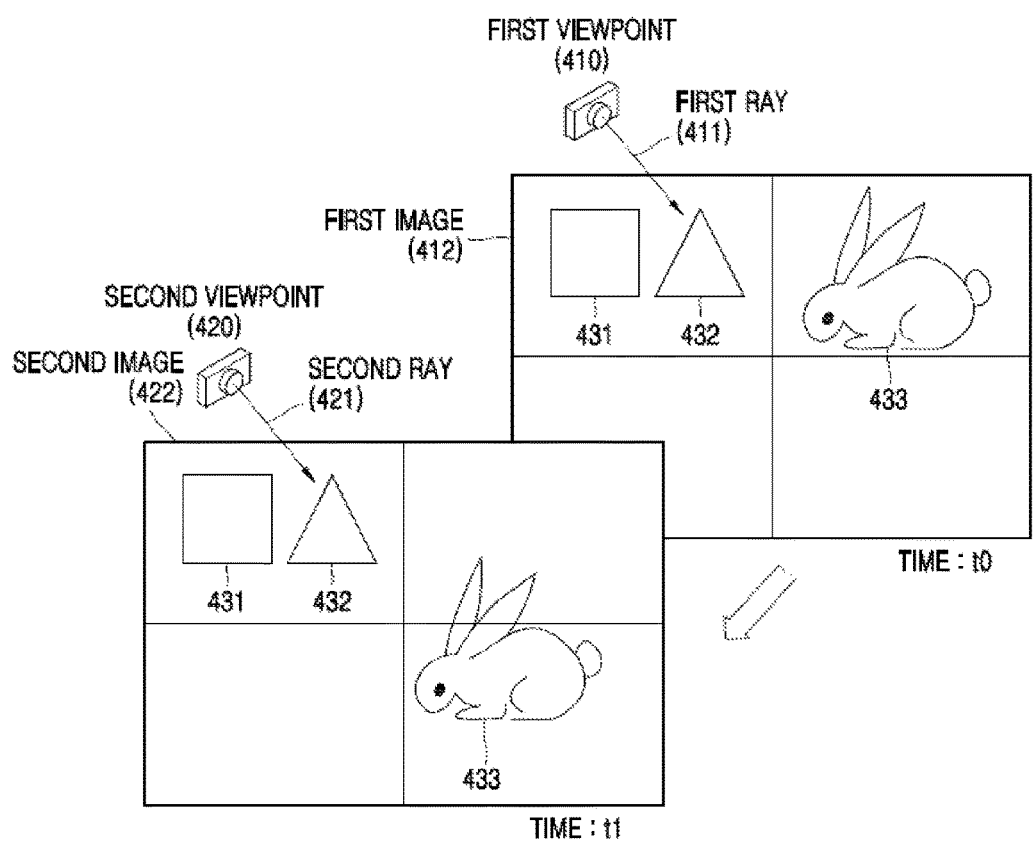
FIG. 4 is a schematic view to illustrate a method of accelerating ray tracing.

FIG. 4 is a schematic view to illustrate a method of accelerating ray tracing. Referring to the example of FIG. 4, a first image 412 is an image that is rendered at t=0, and a second image 422 is an image that is rendered at t=1. As only a rabbit 433 moves between what is depicted in the first image 412 and the second image 422 and a rectangle 431 and a triangle 432 do not move between what is depicted in the first image 412 and the second image 422, the first image 412 and the second image 422 are generally similar to each other.

Accordingly, the ray tracing core 100 is able to conduct rendering with respect to the second image 421 by using a result of rendering the first image 412. For example, when a first viewpoint 410 and a second viewpoint 420 are at the same position, and a first ray 411 and a second ray 421 are in the same direction, the ray tracing core 100 accelerates ray tracing of the second ray 421 by applying a result of ray tracing with respect to the first ray 411 to facilitate the ray tracing of the second ray 421. For example, the traverser 120 of the ray tracing core 100 preferentially traverses a bounding box hit by the first ray 411 when conducting a search with respect to the second ray 421. Also, the intersection tester 130 of the ray tracing core 100 preferentially conducts an intersection test on a triangle 432 hit by the first ray 411 during an intersection test on the second ray.

Figure 5:
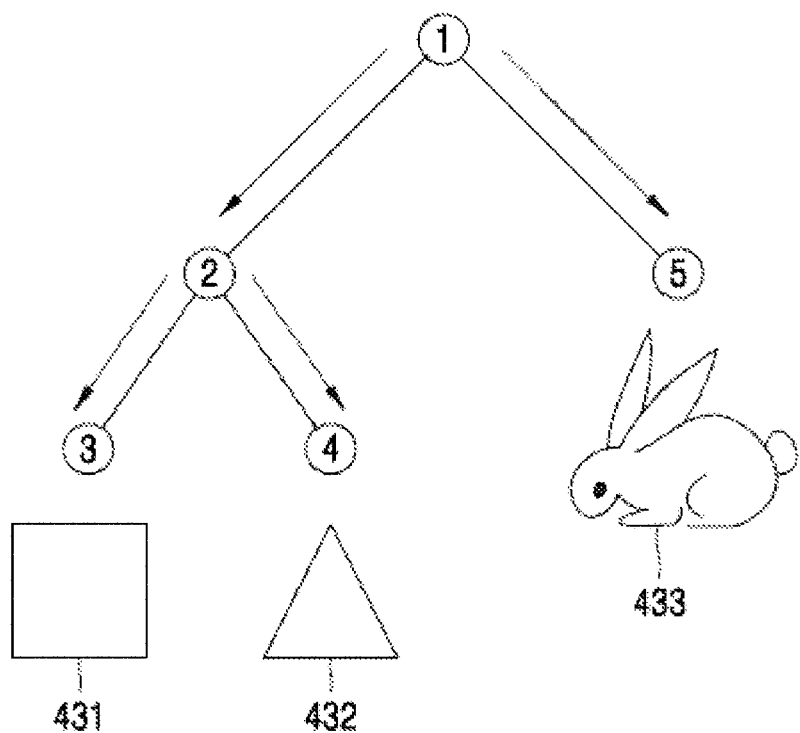
FIG. 5 is another schematic view to illustrate the method of accelerating ray tracing of FIG. 4.

FIG. 5 is another schematic view to illustrate the method of accelerating ray tracing of the example of FIG. 4. Referring to the example of FIG. 5, an acceleration structure includes five nodes, node 1 through 5, wherein nodes 3 through 5 are each a leaf node.

Accordingly, the traverser 120 searches an acceleration structure along three routes. First, the traverser 120 potentially traverses an acceleration structure along node 1, node 2, and node 3, which form a first route. Secondly, the traverser 120 potentially traverses an acceleration structure along node 1, node 2, and node 4, which form a second route. Thirdly, the traverser 120 potentially traverses an acceleration structure along node 1 and node 5 which form a third route. However, when the traverser 120 conducts a search with respect to the second ray 421, the traverser 120 preferentially traverses the second route via which a triangle 432 hit by the first ray 411 is searched. Accordingly, in such an example, the traverser 120 omits an operation of traversing the first route or the third route. By omitting these operations, the overall traversal becomes more efficient.

Figure 6:
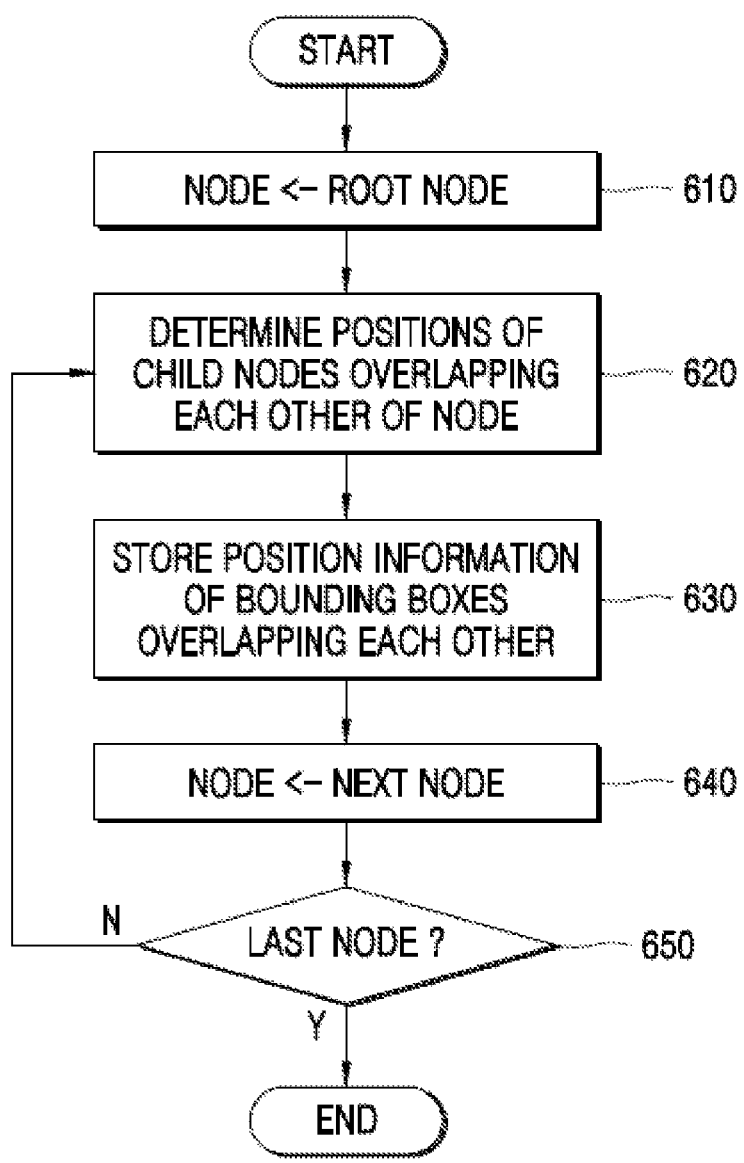
FIG. 6 is a flowchart for illustrating a method of generating an acceleration structure according to an example.

FIG. 6 is a flowchart for illustrating a method of generating an acceleration structure according to an example. Referring to the example of FIG. 6, the acceleration structure generator 200 generates an acceleration structure indicating positions of bounding boxes that overlap each other.

In an operation 610, the acceleration structure generator 200 sets a node as the root node.

In an operation 620, the acceleration structure generator 200 determines, from among child nodes of a node, positions of child nodes overlapping with each other. The term child node, used here, refers to the closest lower nodes to a node. The expression that nodes overlap each other means that bounding boxes indicated by the nodes overlapping with each other. If the child nodes of the node overlap with each other, the acceleration structure generator 200 generates information about the positions of bounding boxes overlapping with each other.

In an operation 630, the acceleration structure generator 200 stores the information about the positions of bounding boxes overlapping with each other generated in operation 620 in a node. For example, the acceleration structure generator 200 stores, in the node, the information about the positions of child nodes overlapping with each other.

In an example, each node is formed of a data structure such as struct, union, and class, but the data structure used for forming each node is not limited thereto, and in various examples, nodes are formed of appropriate data structures that provide the ability to store the data designated for storage in each node. In the specification, storing information about the positions of overlapping child nodes of a node optionally includes storing the information in the data structure forming the node.

In an operation 640, the acceleration structure generator 200 sets a node as a next node. The acceleration structure generator 200 performs the operations 620 through 640 repeatedly with respect to every node in turn.

In an operation 650, the acceleration structure generator 200 determines whether the node is the last node. If the node is the last node, generation of an acceleration structure is completed. If not, the method proceeds back to the operation 620, to repeat operations appropriately 620 through 640 for the next node.

Figure 7:
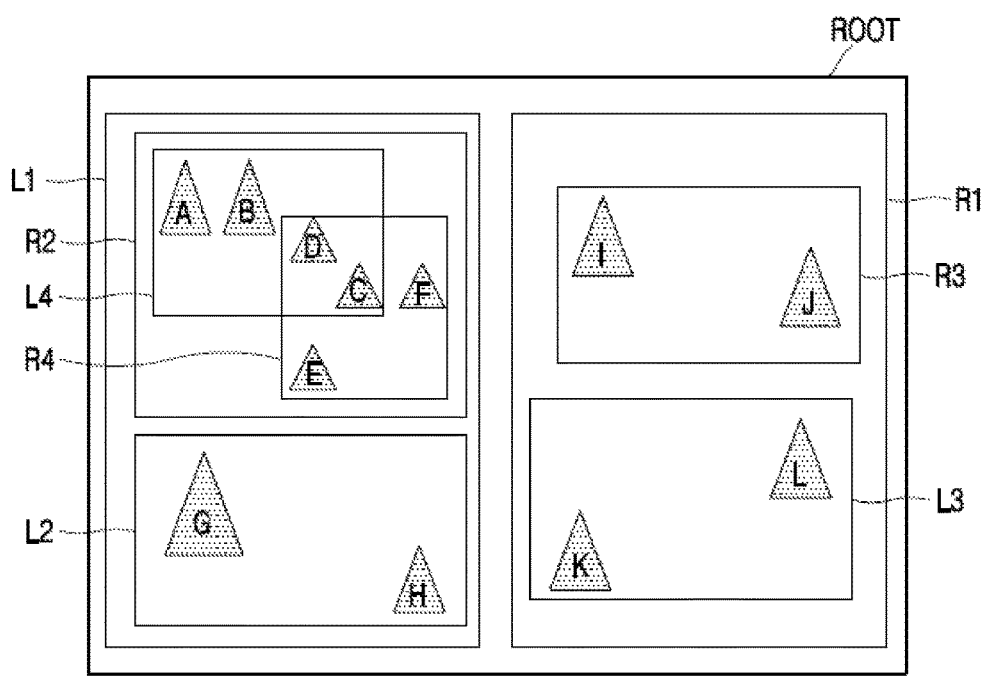
FIG. 7 is a diagram for illustrating that primitives are divided into bounding boxes.

FIG. 7 is a diagram for illustrating that primitives are divided into bounding boxes. Referring to the example of FIG. 7, a bounding box ROOT indicates the uppermost bounding box. For example, the bounding box ROOT includes all bounding boxes and includes a bounding box R1 and a bounding box L1 as the closest bounding boxes to one another. Here, the bounding box R1 and the bounding box L1 do not overlap with each other.

The bounding box L1 includes a bounding box R2 and a bounding box L2. The bounding box R2 and the bounding box L2 do not overlap with each other.

Also, the bounding box R1 includes a bounding box R3 and a bounding box L3. The bounding box R3 and the bounding box L3 do not overlap with each other.

Furthermore, the bounding box R2 includes a bounding box R4 and a bounding box L4. The bounding box R4 and the bounding box L4 overlap with each other. Therefore, information about an overlapping position of the bounding box R4 and the bounding box L4 is stored in a node representing the bounding box R2.

For example, a bounding box is a cuboid including objects located in a 3D space. In geometry, a cuboid is a convex polyhedron bounded by six quadrilateral faces, whose polyhedral graph is the same as that of a cube. Using a method of dividing a space according to a bounding volume hierarchy (BVH), bounding boxes overlap one another as shown in the example of FIG. 7.

The acceleration structure generator 200 generates an acceleration structure that includes information about overlapping positions of bounding boxes.

Figure 8:
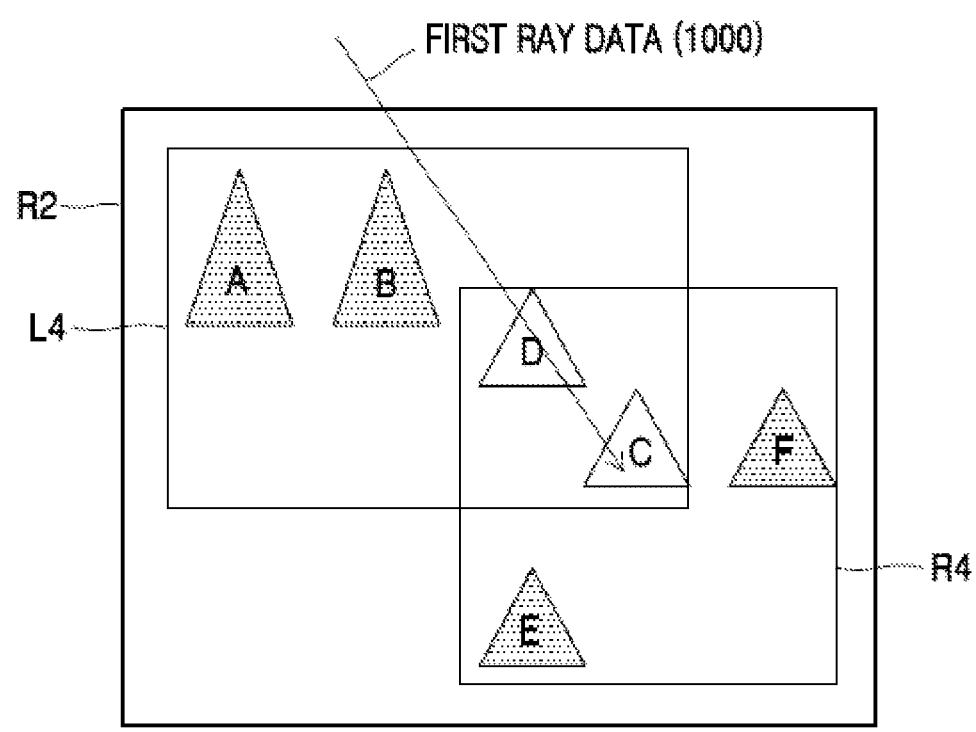
FIG. 8 is a view of overlapping bounding boxes according to an example.

FIG. 8 is a view of overlapping bounding boxes according to an example. In the example of FIG. 8, a first ray data 1000 intersects the bounding boxes and primitives in a 3D space. A bounding box R2 of FIG. 8 corresponds to the bounding box R2 of FIG. 7.

In the example of FIG. 8, the first ray data 1000 intersects the bounding box R2, a bounding box L4, and a bounding box R4. Since the first ray data 1000 intersects the bounding box L4, the ray tracing core 100 determines whether the first ray data 1000 intersects with any of the primitives A, B and C that are included in the bounding box L4.

Referring to the example of FIG. 8, the first ray data 1000 intersects the primitive C. Therefore, the ray tracing core 100 determines that the first ray data 1000 hits the primitive C.

However, since the bounding box L4 and the bounding box R4 overlap with each other, the ray tracing core 100 is required to traverse the bounding box R4. Referring to the example of FIG. 8, the hit primitive C is located in an area in which the bounding box L4 and the bounding box R4 overlap with each other. Therefore, the first ray data 1000 potentially hits other primitives included in the bounding box R4 initially before hitting the primitive C.

Therefore, the ray tracing core 100 determines whether the first ray data 1000 intersects any of the primitives D, E and F included in the bounding box R4. Referring to the example of FIG. 8, the first ray data 1000 intersects the primitive D. Furthermore, the first ray data 1000 intersects the primitive D first, before intersecting the primitive C. Hence, the ray tracing core 100 determines that the first ray data 1000 hit the primitive D as a result.

Figure 9:
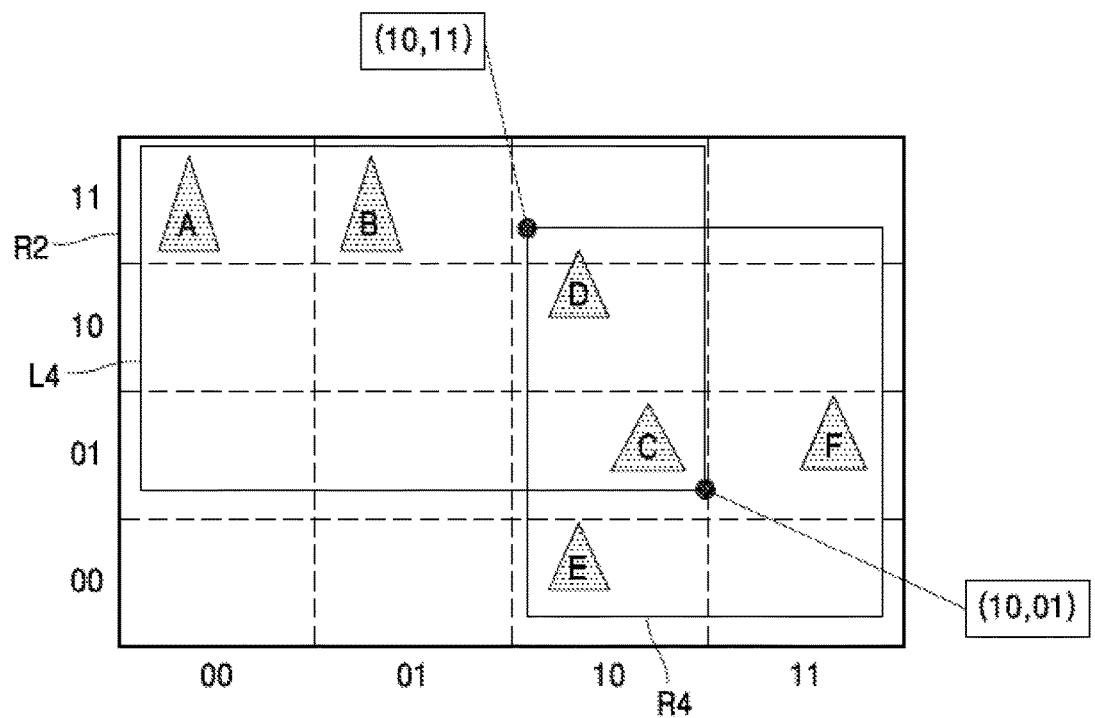
FIG. 9 is a view illustrating a method of representing information about an overlapping position, according to an example.

FIG. 9 is a view illustrating a method of representing information about an overlapping position, according to an example. When two bounding boxes overlap with each other, the area where the bounding boxes overlap is specified as positions of vertices at both ends of a diagonal. In such an example, a space is divided into a grid in order to save a storage space and improve processing speed. The example of FIG. 9 illustrates the space as being two-dimensional (2D) for convenience of explanation. However, the disclosed example is also applicable to a 3D space.

In an example, a space corresponding to a bounding box R2 is divided into 16 regions in a 4×4 grid. Furthermore, an area of 4 bits having a lateral width of 2 bits and a longitudinal width of 2 bits is optionally used in order to specify a position of each grid cell. The number of bits used to specify the number and positions of grid cells used to divide a space is not limited thereto, and other grids use more regions and more bits, as appropriate.

Referring to the example of FIG. 9, a vertex that is overlapping with a bounding box L4 is located in a grid cell (10, 01). Furthermore, a vertex that is overlapping with a bounding box R4 is located in a grid cell (10, 11). Therefore, information about an overlapping position of the bounding box L4 and the bounding box R4 is represented as (10, 11)/(10, 01), by designating cells appropriately. The information about the overlapping position (10, 11)/(10, 01) is information about how the two bounding boxes overlap each other over the grid cells (10, 11), (10, 10), and (10, 01).

Referring to the example of FIG. 9, the first ray data 1000 intersects the primitive C in the grid cells (10, 01). For example, the ray tracing core 100 determines that the first ray data 1000 intersects the primitive C in the overlapping position by using information about an overlapping position.

Figure 10:
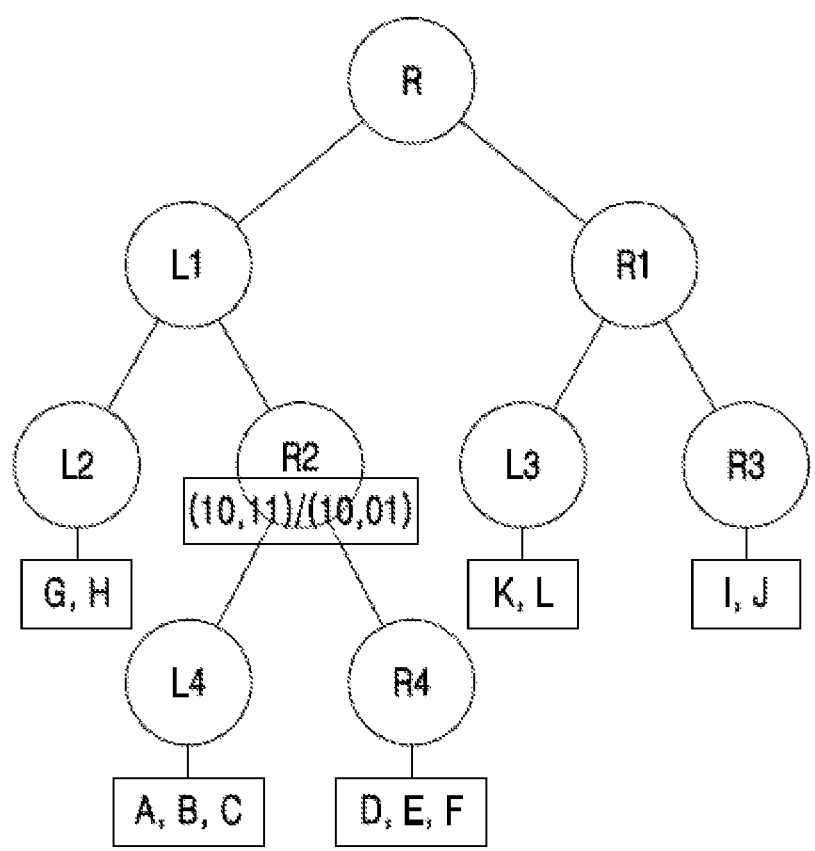
FIG. 10 is a diagram for illustrating an acceleration structure according to an example.

FIG. 10 is a diagram for describing an acceleration structure according to an example. Referring to the example of FIG. 10, the acceleration structure generator 200 generates a binary tree-like acceleration structure.

In the example of FIG. 10, a node R denotes the ROOT node and denotes the bounding box ROOT of FIG. 7. For example, the node R is the uppermost node and includes a child node R1 and a child node L1.

Also, in the example of FIG. 10, a node R1 includes a child node R3 and a child node L3. Additionally, a node L1 includes the child node L2 and the child node R2. Here, the node R2 includes a child node L4 and a child node R4.

A bounding box L2 corresponding to the node L2 does not include a bounding box anymore and includes primitives G and H. Therefore, the node L2 includes a leaf node including the primitives G and H as a lower node.

A bounding box L4 corresponding to the node L4 does not include a bounding box anymore and includes primitives A, B and C. Therefore, the node L2 includes a leaf node including the primitives A, B and C as a lower node.

A bounding box R4 corresponding to the node R4 does not include a bounding box anymore and includes primitives D, E and F. Therefore, the node L2 includes a leaf node including the primitives D, E and F as a lower node.

A bounding box L3 corresponding to the node L3 does not include a bounding box anymore and includes primitives K and L. Therefore, the node L3 includes a leaf node including the primitives K and L as a lower node.

A bounding box R3 corresponding to the node R3 does not include a bounding box anymore and includes primitives I and J. Therefore, the node R3 includes a leaf node including the primitives I and J as a lower node.

The acceleration structure generator 200 does not need to store information about an overlapping position of a node that is not overlapped by a child node. In an example, a node that is not overlapped by a child node possibly has a parameter or a flag that indicates that the node is not overlapped by any of the child nodes. For example, each node of the acceleration structure has a flag field and a field of information about an overlapping position representing whether the child node overlaps with the node.

When the child node overlaps with the node, the acceleration structure generator 200 stores a value representing that the child node overlaps the node into the flag field. Furthermore, the acceleration structure generator 200 possibly stores the information about the overlapping position in the overlapping position information field. When the child node does not overlap the node, the acceleration structure generator 200 stores a value indicating that the node is not overlapped by any of the child nodes into the flag field and vacates the overlapping position information field.

In another example, each node does not necessarily have a flag field. However, in such an example, in a field of information about an overlapping position of a node that is not overlapped by a child node, a certain value indicating that the node is not overlapped by any of the child nodes is stored.

In this example, since bounding boxes corresponding to the child nodes L4 and R4 of the node R2 overlap with each other in grid cells (10, 11) to (10, 01), the acceleration structure generator 200 stores a (10, 11)/(10, 01) value as information about an overlapping position in the node R2.

Figure 11:
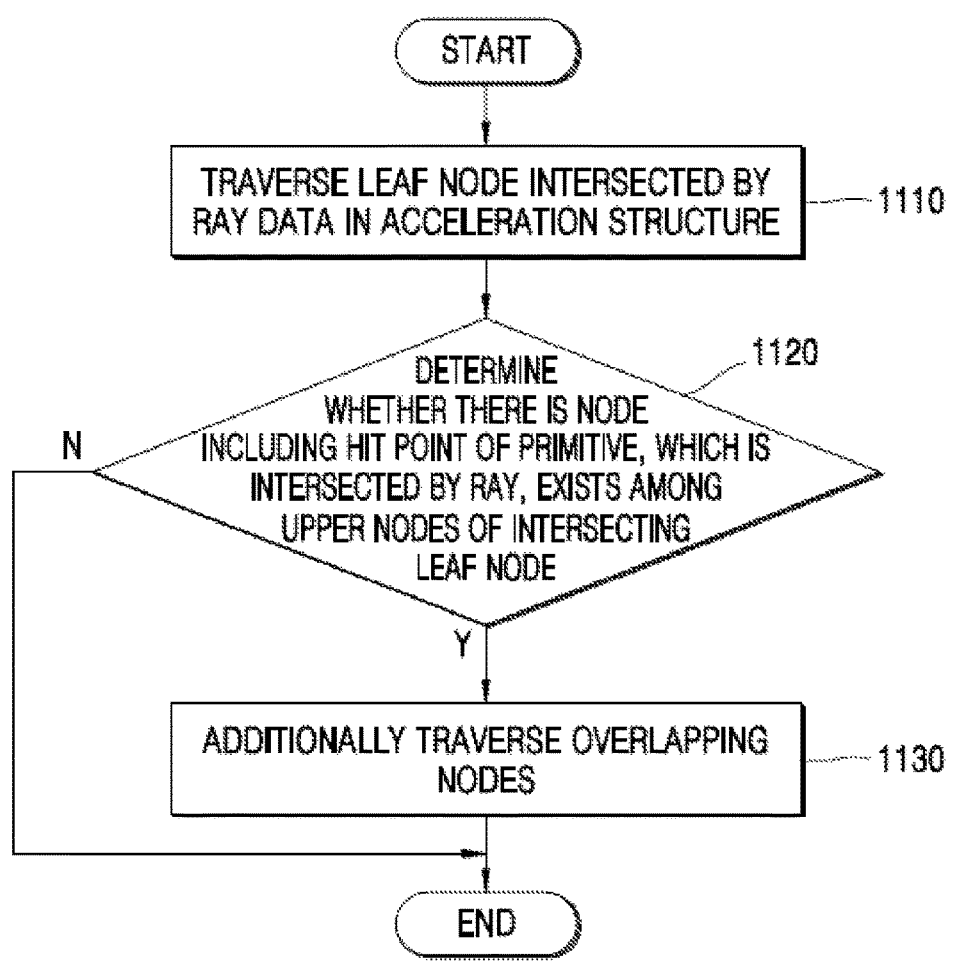
FIG. 11 is a flowchart for illustrating a method of traversing an acceleration structure according to an example.

FIG. 11 is a flowchart for illustrating a method of traversing an acceleration structure according to an example. Referring to the example of FIG. 11, the ray tracing core 100 traverses an acceleration structure based on information about overlapping positions of nodes.

In an operation 1110, the ray tracing core 100 traverses a leaf node in an acceleration structure that intersects ray data. For example, the leaf node is the lowermost node in a tree-like acceleration structure. The ray tracing core 100 also possibly traverses a primitive, from among primitives belonging to the intersecting leaf node, which is intersected by a ray.

The ray tracing core 100 sequentially traverses an acceleration structure from the ROOT node to a leaf node. For example, when the ray tracing core 100 traverses a tree-like acceleration structure, the ray tracing core 100 traverses first a near node, pushes a far node to a stack, and then traverses the far node after the traversal of the near node.

In an operation 1120, the ray tracing core 100 determines whether a node including a hit point of the primitive, which is intersected by a ray, exists among upper nodes of the intersecting leaf node. Here, the hit point of the primitive is a position in which a ray hits the primitive. If the ray tracing core 100 determines that there is a node that satisfies the condition, the ray tracing core 100 proceeds to an operation 1130 by finding the nearest node that satisfies the condition.

If the ray tracing core 100 determines that none of the nodes satisfy the condition or that none of the nodes are to be traversed from among nodes that satisfy the condition, traversal of an acceleration structure is terminated early.

In the operation 1130, the ray tracing core 100 additionally traverses overlapping nodes.

Figure 12:
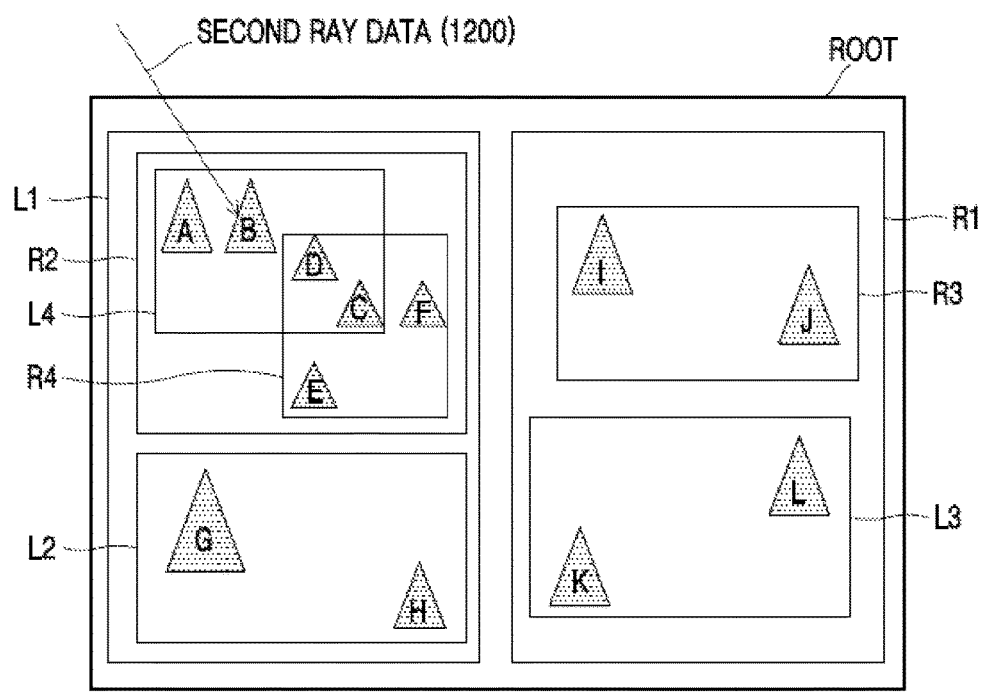
FIG. 12 is a diagram for illustrating a traversing operation.

FIG. 12 is a diagram for illustrating a traversing operation. Second ray data 1200 intersects with bounding boxes and primitives in a 3D space. In the example of FIG. 12, the second ray data 1200 intersects a bounding box ROOT, a bounding box L1, a bounding box R1, a bounding box R2, and a bounding box L4. Furthermore, the second ray data 1200 intersects with a primitive B.

Figure 13:
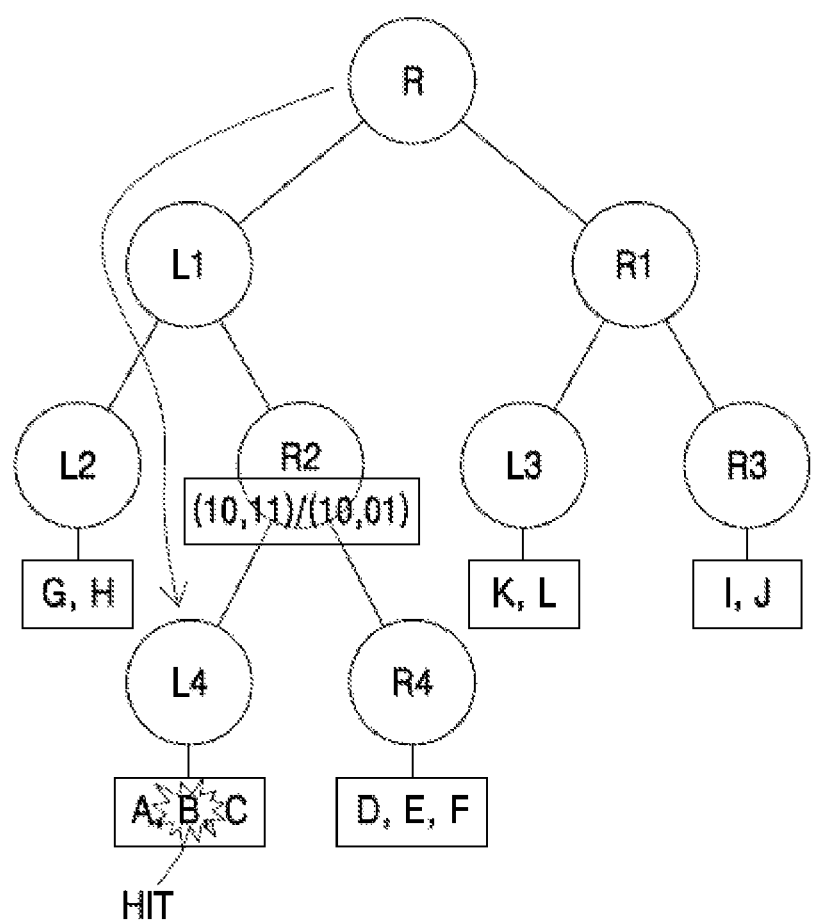
FIG. 13 is a diagram for illustrating a method of traversing an acceleration structure according to an example.

FIG. 13 is a diagram for illustrating a method of traversing an acceleration structure according to an example.

Referring to the example of FIG. 13, the ray tracing core 100 terminates traversal of an acceleration structure early by referring to information about an overlapping position. The nodes shown in FIG. 13 correspond to the bounding boxes shown in the example of FIG. 12.

In this example, the ray tracing core 100 determines whether a root node R and the second ray data 1200 intersect with each other. For example, the ray tracing core 100 determines whether the root node R and the second ray data 1200 intersect each with other by determining whether the bounding box ROOT and the second ray data 1200 intersect with each other. Referring to the example of FIG. 12, the bounding box ROOT and the second ray data 1200 do intersect with each other.

For example, the ray tracing core 100 proceeds with the traversal from the route node to a node L1 that is a near node. In this example, the ray tracing core 100 pushes and stores a node R1 in a stack. Next, the ray tracing core 100 pops the node R1 that is stored in the stack and traverses the node. Popping the node R1 stored in the stack represents reading and deleting data that is stored in the stack node R1. Alternatively put, data is deleted from the stack, but a data processing unit also receives and processes the data that is deleted from the stack.

Also, the ray tracing core 100 determines whether a node L1 and the second ray data 1200 intersect with each other. For example, the ray tracing core 100 determines whether the node L1 and the second ray data 1200 intersect with each other by determining whether the bounding box L1 and the second ray data 1200 intersect with each other. Referring to the example of FIG. 12, the bounding box L1 and the second ray data 1200 do intersect with each other.

The ray tracing core 100 proceeds with the traversal from the node L1 to a node L2 that is a near node. The ray tracing core 100 pushes and stores a node R2 in a stack. Next, the ray tracing core 100 may pop and traverse the node R2 stored in the stack.

The ray tracing core 100 determine whether a node L2 and the second ray data 1200 intersect each other. Referring to FIG. 12, the bounding box L2 and the second ray data 1200 do not intersect each other. Therefore, the ray tracing core 100 may pop and traverse the node R2 stored in the stack.

The ray tracing core 100 determine whether the node R2 and the second ray data 1200 intersects each other. The ray tracing core 100 may determine whether the node R2 and the second ray data 1200 intersect each other by determining whether the bounding box R2 and the second ray data 1200 intersect each other. Referring to FIG. 12, the bounding box R2 and the second ray data 1200 intersect each other.

The ray tracing core 100 proceeds with the traversal from the node R2 to a node L4 that is a near node. The ray tracing core 100 pushes and stores a node R4 in a stack. Next, the ray tracing core 100 may pop and traverse the node R4 stored in the stack.

In this example, the ray tracing core 100 determines whether the node L4 and the second ray data 1200 intersect with each other. For example, the ray tracing core 100 determines whether the node L4 and the second ray data 1200 intersect with each other by determining whether the bounding box L4 and the second ray data 1200 intersect with each other. Referring to the example of FIG. 12, the bounding box L4 and the second ray data 1200 do intersect each other.

The ray tracing core 100 determines whether primitives A, B and C and the second ray data 1200 intersect with each other. Referring to the example of FIG. 12, the primitive B and the second ray data 1200 do intersect with each other.

Referring to the example of FIG. 9, the second ray data 1200 and the primitive B intersect with each other in a grid cell (01, 11). In this example, since the grid cell (01, 11) is not included in information about an overlapping position of the node R2, the ray tracing core 100 ceases traversal of a node and terminates the traversal with respect to the second ray data 1200. When the traversal with respect to the second ray data 1200 is terminated, the ray tracing core 100 pops nodes stored in the stack nodes without traversal. Hence, traversal of unnecessary nodes is avoided and processing is made to be more efficient.

In another example, while traversing to another child node, the ray tracing core 100 pushes the current child node into the stack. For example, while progressing from the node R2 to the node L4, the ray tracing core 100 pushes the node R2 into the stack.

After terminating the traversal with respect to the node L4, the ray tracing core 100 pops the node R2 and determines whether to traverse the node R4 or not by using information about an overlapping position that is stored in the node R2. Since the grid cell (01, 11) including the primitive B is not included in the information corresponding to the overlapping position of the node R2, the ray tracing core 100 ceases traversal of a node and terminates the traversal with respect to the second ray data 1200.

Figure 14:
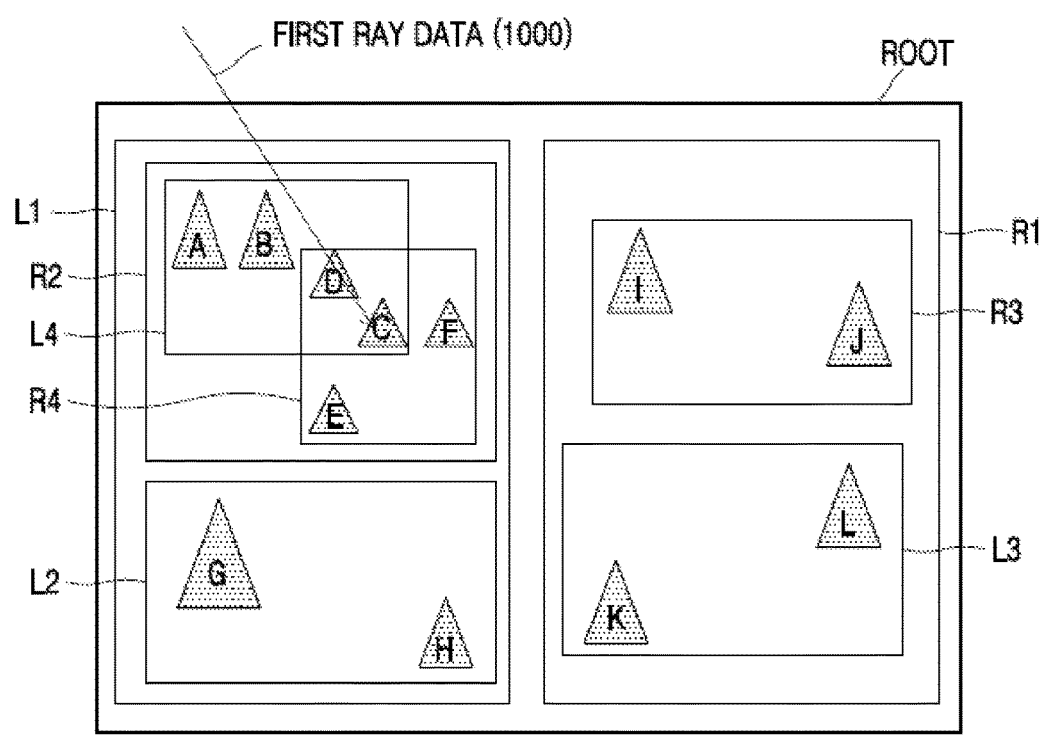
FIG. 14 is a diagram for illustrating a traversal process.

FIG. 14 is a diagram for illustrating a traversal process. In the example of FIG. 14, first ray data 1000 intersects with bounding boxes and primitives in a 3D space. For example, the first ray data 1000 intersects a bounding box ROOT, a bounding box L1, a bounding box R2, a bounding box L4, and a bounding box R4. Furthermore, the first ray data 1000 intersects with primitives C and D.

Figure 15:
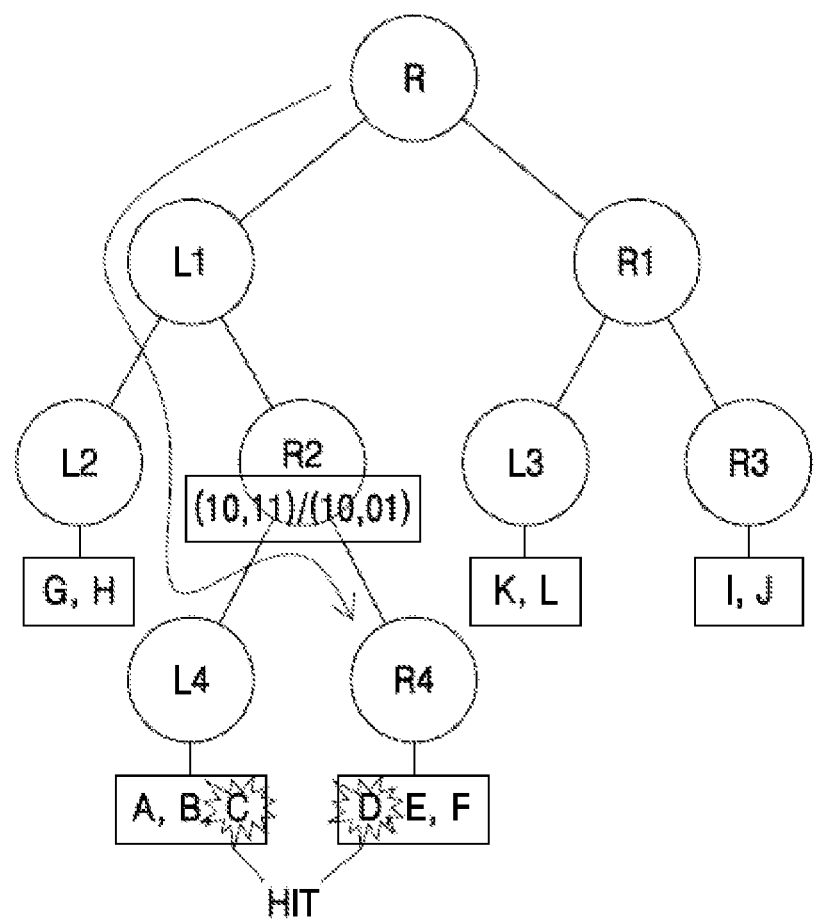
FIG. 15 is a diagram for illustrating a method of traversing an acceleration structure according to an example.

FIG. 15 is a diagram for illustrating a method of traversing an acceleration structure according to an example. Referring to the example of FIG. 15, the ray tracing core 100 terminates traversal of an acceleration structure early by referring to information about an overlapping position. The nodes shown in FIG. 15 correspond to the bounding boxes shown in the example of FIG. 14.

In the example of FIG. 15, the ray tracing core 100 traverses through a root node R, a node L1, a node L2, a node R2, and a node L4 and also determines whether a leaf node and the first ray data 1000 intersect with each other. Nodes that are not traversed are stored in a stack. In this example, the first ray data 1000 intersects all of the root node R, the node L1, the node L2, the node R2, and the node L4. The ray tracing core 100 also determines whether primitives A, B and C belonging to the leaf node intersect with the first ray data 1000. For example, the first ray data 1000 intersects with the primitive C.

Referring to the example of FIG. 9, the first ray data 1000 and the primitive C intersect with each other in a grid cell (10, 01). Because the grid cell (10, 01) is included in the information about the overlapping position of the node R2, the ray tracing core 100 traverses a node R4. In this example, the first ray data 1000 and the node R4 intersect with each other. The ray tracing core 100 also considers whether primitives D, E and F belonging to the leaf node that is a lower node of the node R4 intersect with the first ray data 1000. Here, the first ray data 1000 and the primitive D do intersect with each other.

In an example, the primitive D intersects with the first ray data 1000 prior to intersecting with the primitive C. In this example, the ray tracing core 100 determines that the first ray data 1000 hits the primitive D. Because there are no other bounding boxes that overlap, the ray tracing core 100 ceases traversal of a node and terminates the traversal with respect to the first ray data 1000.

In another example, while traversing to another child node, the ray tracing core 100 pushes the current child node to the stack. For example, while progressing from the node R2 to the node L4, the ray tracing core 100 pushes the node R2 onto the stack.

After terminating the traversal with respect to the node L4, the ray tracing core 100 pops the node R2 and determines whether to traverse the node R4 or not with reference to information about an overlapping position that is stored in the node R2. Since the grid cell (10, 01) including the primitive C is included in information corresponding to the overlapping position of the node R2, the ray tracing core 100 progresses traversal to the node R4.

Figure 16:
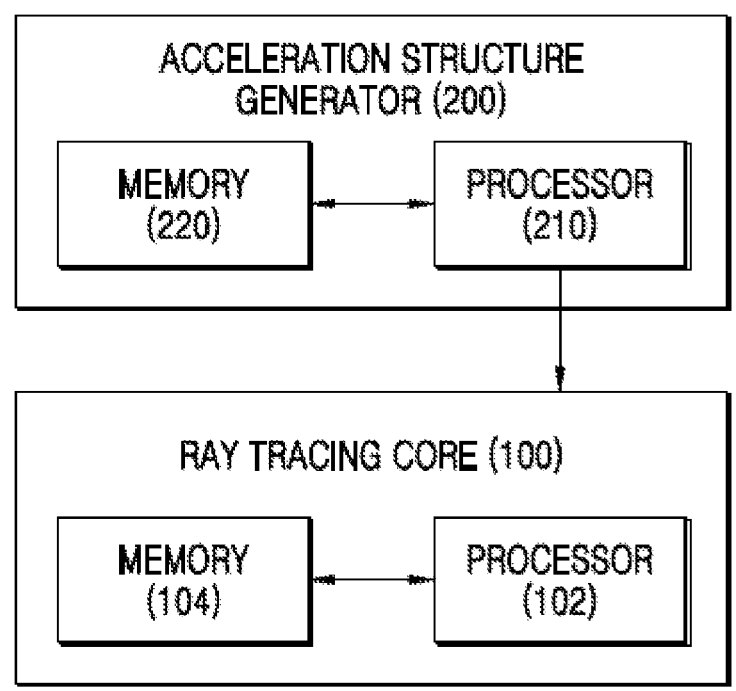
FIG. 16 is a diagram for illustrating an acceleration structure generator and a ray tracing core, according to an example.

FIG. 16 is a diagram for illustrating the acceleration structure generator 200 and the ray tracing core 100, according to an example. Referring to the example of FIG. 16, the acceleration structure generator 200 includes a processor 210 and a memory 220. However, these are only example elements and other appropriate elements are optionally present in addition to or instead of these elements.

For example, the processor 210 divides a 3D space including primitives into bounding boxes and obtains position information for the bounding boxes overlapping each other. Furthermore, the processor 210 generates an acceleration structure representing the position information and an inclusion relation between the bounding boxes. Examples of such an acceleration structure are discussed further, above.

Also, in this example, information about the 3D space is stored in the memory 220. Furthermore, the memory 220 stores the acceleration structure generated by the processor 210. However, these are only example elements and other appropriate elements are optionally present in addition to or instead of these elements.

The ray tracing core 100 also includes a processor 102 and a memory 104. For example, the processor 102 of FIG. 16 corresponds to the ray generator 110, the traverser 120, the intersection tester 130, and the shader 140 of the example of FIG. 2.

The processor 102 traverses the acceleration structure until it reaches the leaf node. In an example, the processor 102 traverses the acceleration structure downward. The processor 102 selects a node corresponding to a bounding box intersected by ray data from among child nodes and accordingly progresses traversal.

Furthermore, the processor 102 obtains a hit point of a primitive intersected by ray data by traversing to the reached leaf node. Furthermore, the processor 102 traverses to a node including the hit point in the acceleration structure. If there is a node that includes the hit point but the node has not yet been traversed, the processor 102 traverses that node. If there is no node satisfying the condition, the processor 102 terminates the traversal.

In an example, a node includes position information for determining whether the node includes a hit point or not. The processor 102 compares a hit point to position information of a node before traversing the node, and the processor possibly traverses the node only when the hit point is included in the position information of the node. For example, the position information of the node is information about an overlapping position relevant to the node.

In the example of FIG. 16, the memory 104 stores an acceleration structure that is generated in the acceleration structure generator 200. Furthermore, the memory 104 stores a result of traversing the acceleration structure by the processor 102.

As described above, according to the one or more of the above examples, an acceleration structure indicating overlapping of bounding boxes by using information about an overlapping position is generated.

Also, it is further determined whether to additionally traverse the acceleration structure based on the information about overlapping positions of bounding boxes. By traversing the acceleration structure in this manner, this allows for reducing the computational time for traversal of the acceleration structure and preventing or minimizing the number of unnecessary traversals. As a result, the ray tracing becomes more efficient.

The apparatuses, units, modules, devices, and other components illustrated in FIGS. 1-16 that perform the operations described herein with respect to FIGS. 1-16 are implemented by hardware components. Examples of hardware components include controllers, sensors, generators, drivers, memories, comparators, arithmetic logic units, adders, subtractors, multipliers, dividers, integrators, and any other electronic components known to one of ordinary skill in the art. In one example, the hardware components are implemented by computing hardware, for example, by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 1-16. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-16 that perform the operations described herein with respect to FIGS. 1-16 are performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of traversing an acceleration structure comprising one or more nodes, the method comprising:
traversing, using a processor, the acceleration structure until the traversing reaches a leaf node;

obtaining, using the processor, a hit point of a primitive intersected by ray data by traversing the leaf node;

traversing, using the processor, a node of the acceleration structure comprising the hit point; and rendering an image using results of traversing the node of the acceleration structure;

wherein, each node of the one or more nodes corresponds to one of plural bounding boxes which divide a three-dimension (3D) space, and comprises position information of where the bounding boxes overlap each other, and the 3D space is divided into grids, the position information comprising grid positions where the bounding boxes overlap each other.

2. The method of claim 1, wherein the traversing a node comprises:

terminating the traversal if there is no node that comprises the hit point.

3. The method of claim 1, wherein the traversing a node comprises:

updating the hit point if the primitive intersected by the ray data exists in the node.

4. The method of claim 1, wherein the hit point is indicated by a grid position where the primitive is located.

5. A device for traversing an acceleration structure comprising one or more nodes, the device comprising:

a processor configured to traverse the acceleration structure until the traversing reaches a leaf node, obtain a hit point of a primitive intersected by ray data by traversing the leaf node, traverse a node of the acceleration structure comprising the hit point, and render an image using results of traversing the node of the acceleration structure; and a memory configured to store the acceleration structure;

wherein, each node of the one or more nodes corresponds to one of plural bounding boxes which divide a three-dimensional (3D) space, and comprises position information of where the bounding boxes overlap each other, and the 3D space is divided into grids, the position information comprising grid positions where the bounding boxes overlap each other.

6. The device of claim 5, wherein the processor terminates the traversal if there is no node that comprises the hit point.

7. The device of claim 5, wherein the processor updates the hit point if the primitive intersected by the ray data exists in the node.

8. The device of claim 5, wherein the hit point is indicated by a grid position where the primitive is located.

9. A non-transitory computer-readable storage medium storing instructions that when executed by computing hardware, implements a method of traversing an acceleration structure comprising one or more nodes, the method comprising:

traversing, using a processor, the acceleration structure until the traversing reaches a leaf node;

obtaining, using the processor, a hit point of a primitive intersected by ray data by traversing the leaf node; and traversing, using the processor, a node of the acceleration structure comprising the hit point; and rendering an image using results of traversing the node of the acceleration structure;

wherein, each node of the one or more nodes corresponds to one of plural bounding boxes which divide a three-dimensional (3D) space, and comprises position information of where the bounding boxes overlap each other, and the 3D space is divided into grids, the position information comprising grid positions where the bounding boxes overlap each other.

10. The non-transitory computer-readable storage medium of claim 9, wherein the traversing a node comprises terminating the traversal if there is no node that comprises the hit point.

11. The non-transitory computer-readable storage medium of claim 9, wherein the traversing a node comprises updating the hit point if a primitive intersected by the ray data exists in the node.

12. The non-transitory computer-readable storage medium of claim 9, wherein the hit point is indicated by a grid position where the primitive is located.

* * * * *